United States Patent
Omori et al.

(10) Patent No.: US 6,567,505 B1
(45) Date of Patent: May 20, 2003

(54) METHOD AND APPARATUS FOR CAMP-ON SERVICE CONTROL

(75) Inventors: Wataru Omori, Sendai (JP); Junichi Wagatsuma, Sendai (JP); Mitsuhiro Sato, Sendai (JP); Kyoko Tanaka, Sendai (JP); Takahiro Shinagawa, Sendai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/187,609

(22) Filed: Nov. 6, 1998

(30) Foreign Application Priority Data

Mar. 20, 1998 (JP) .......................................... 10-072207

(51) Int. Cl.⁷ ............................................... H04M 1/64
(52) U.S. Cl. ............... 379/84; 379/209.01; 379/210.01; 379/198
(58) Field of Search ............................ 379/209.01, 231, 379/202.01, 201.12, 207.05, 114.29, 167.01, 156, 162, 165, 188, 191, 196, 197, 198; 455/3.04; 799/102; 370/264

(56) References Cited

U.S. PATENT DOCUMENTS

| 3,889,068 | A | * | 6/1975 | Dellecker | 379/167.01 |
|---|---|---|---|---|---|
| 3,928,729 | A | * | 12/1975 | Nielson | 179/18 |
| 4,166,929 | A | * | 9/1979 | Sheinbein | 179/18 |
| 5,155,761 | A | * | 10/1992 | Hammond | 379/67 |
| 5,185,782 | A | * | 2/1993 | Srinivasan | 379/67 |
| 5,309,028 | A | * | 5/1994 | Brown et al. | 370/264 |
| 5,594,902 | A | * | 1/1997 | Nishigaya et al. | 709/102 |
| 5,692,033 | A | * | 11/1997 | Farris | 379/209.01 |
| 5,867,780 | A | * | 2/1999 | Malackowski et al. | 455/3.04 |

FOREIGN PATENT DOCUMENTS

| JP | 52-17706 | 2/1977 | |
| JP | 62-12258 | 1/1987 | |
| JP | 7-7556 | 1/1995 | |
| JP | 07007556 A | * 1/1995 | ............ H04M/3/42 |

\* cited by examiner

*Primary Examiner*—Fan Tsang
*Assistant Examiner*—Gerald Gauthier
(74) *Attorney, Agent, or Firm*—Katten Muchin Zavis Rosenman

(57) ABSTRACT

After a camp-on to a telephone B has been registered by a telephone A, when a callback is returned by detecting call termination of the telephone B, the callback can be temporarily released or the camp-on can be released by performing a release operation from a telephone D registered in the same group as the telephone A.

8 Claims, 4 Drawing Sheets

METHOD AND APPARATUS FOR CAMP-ON SERVICE CONTROL

BACKGROUND OF THE INVENTION

1. Field of the Invention

The present invention relates to a method and apparatus for camp-on service control.

2. Description of the Related Art

In camp-on service, when the called party is busy, the calling party registers a camp-on busy by dialing a specific number or by pressing a camp-on feature button, and the called party (the telephone to which the registration was effected) is monitored at predetermined intervals of time to check if it is busy or not. When it is detected that the called party is not busy, the calling party (the telephone that effected the registration) is automatically called back with a callback tone. When he answers by going off-hook, the party he is trying to reach is dialed automatically.

This camp-on service includes a feature that allows the user to cancel the camp-on busy after it has been registered. However, the camp-on busy feature, once canceled, cannot be resumed unless the user dials the same party once again. Furthermore, when the user's telephone is called back after the user has left his desk forgetting to cancel the registration, a third party unacquainted with the situation has to take the telephone off-hook to stop the callback tone; however, in this case also, since the exchange machine cannot identify the person who has took the telephone, a call is automatically initiated, and an awkward situation may result. Besides, the camp-on registration is canceled at this instant.

Japanese Unexamined Patent Publication No. 62-12258 discloses a camp-on control method that allows the user to cancel the camp-on busy registration by using another telephone available to him even when he has left his desk forgetting to cancel the registration.

However, to cancel the registration by using another telephone, the person who is trying to cancel it must know the telephone number of the telephone that originated the registration, as well as the fact that the camp-on busy is currently registered; the problem here is that the person that can cancel the registration is, in effect, limited to the very person that effected it. Furthermore, once the callback tone has begun to sound, the registration cannot be canceled.

Japanese Unexamined Patent Publication No. 7-7556 discloses a camp-on control method that allows the user to temporarily hold the callback feature by dialing a specific number when he leaves his desk, and to resume the callback feature by operating to release the hold when he returns to his desk.

In this case also, the same problem as earlier described will occur if he forgot to perform the holding operation when leaving his desk.

SUMMARY OF THE INVENTION

Accordingly, a first object of the present invention is to achieve camp-on service control by which a callback based on a camp-on can be stopped in an appropriate manner even by a third party unacquainted with the situation.

A second object of the present invention is to achieve camp-on service control by which the callback feature, once stopped, can be restored.

According to the present invention, there is provided a camp-on service control method comprising the steps of: monitoring a first telephone at predetermined intervals of time to check if the first telephone is busy or not; calling back a second telephone if the first telephone is not busy; and stopping the callback when a specific number is sent out from a third telephone while the second telephone is being called back.

Preferably, in the above method, the second telephone and the third telephone belong to the same group, and the method further comprises the step of identifying the telephone being called back from among telephones belonging to the same group when the specific number is sent out from the third telephone.

Further preferably, the method further comprises the step of stopping the monitoring of the first telephone when the specific number is sent out from the third telephone.

Preferably, the method further comprises the step of resuming the monitoring of the first telephone when a second specific number is sent out from the third telephone.

According to the present invention, there is also provided a camp-on service control apparatus comprising: means for monitoring a first telephone at predetermined intervals of time to check if the first telephone is busy or not; means for calling back a second telephone if the first telephone is not busy; and means for stopping the callback when a specific number is sent out from a third telephone while the second telephone is being called back.

Preferably, in the above apparatus, the second telephone and the third telephone belong to the same group, and the apparatus further comprises means for identifying the telephone being called back from among telephones belonging to the same group when the specific number is sent out from the third telephone.

Further preferably, the apparatus comprises means for stopping the monitoring of the first telephone when the specific number is sent out from the third telephone.

Preferably, the apparatus further comprises means for resuming the monitoring of the first telephone when a second specific number is sent out from the third telephone.

DESCRIPTION OF THE PREFERRED EMBODIMENTS

Figure 1:
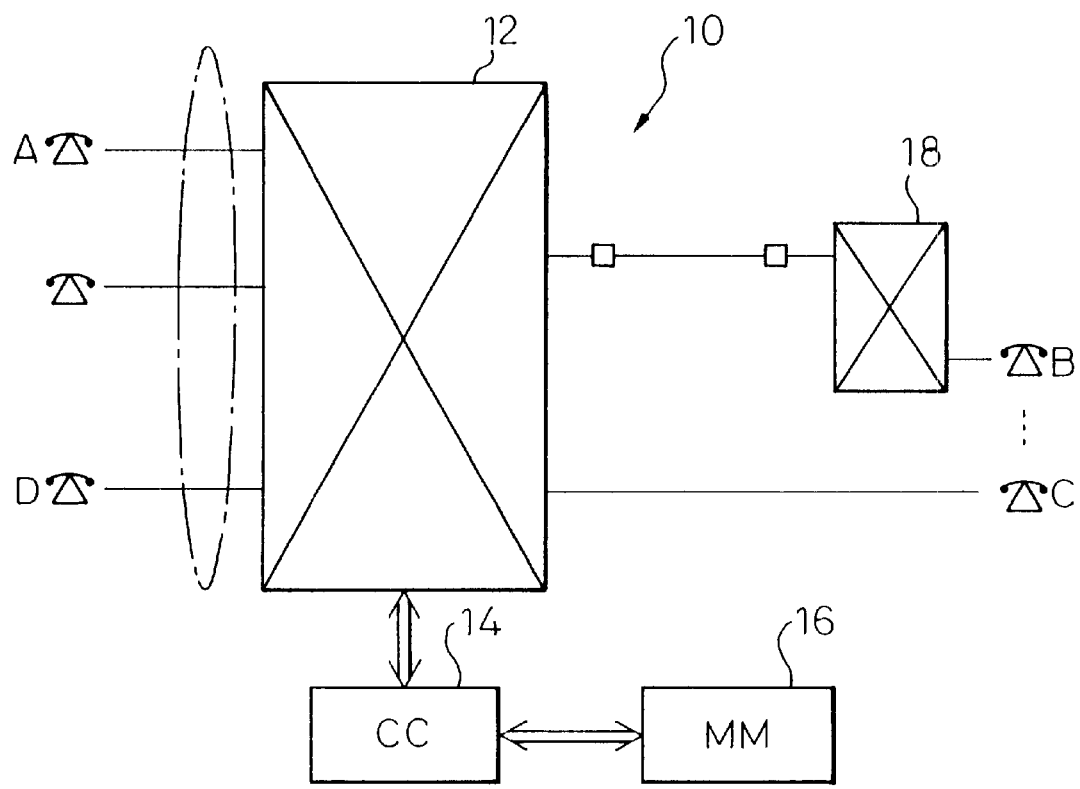
FIG. 1 is a block diagram of a telephone communication system to which the camp-on service control of the present invention is applied.

FIG. 1 shows the configuration of a telephone communication system to which the camp-on service control of the present invention is applied. In FIG. 1, an exchange 10 includes a network 12, a central control unit (CC) 14, and a main memory 16. A large number of subscriber lines, including the ones accommodating telephones A, C, and D, are connected to the network 12. It is assumed here that at least the telephone A subscribes to a camp-on service. Further, the telephones A and D are on the same floor and are set up to belong to the same camp-on group. This camp-on group setting is stored in the main memory 16, and can be changed. To the network 12 is also connected another exchange 18, where a telephone B is accommodated, as well as devices for generating various tones, though not shown here.

In addition to an area for storing subscriber data of each subscriber and an area for storing call control blocks (CCBs) containing data necessary for call connections, an area for a camp-on group table for storing the camp-on group setting and an area for storing data for carrying out the camp-on service are reserved in the main memory 16. The subscriber data of each subscriber is maintained in the memory, starting from the time that a subscription contract is concluded with the subscriber and a telephone number is assigned, until the contract terminates, and holds records of registration status of additional services such as a camp-on service. The CCB for a given call is maintained in the memory, starting from the time that the call is initiated, until the call is cleared, and records the status (telephone number, serving point, connection condition, number, etc.) of the telephone during the call. The main memory 16 also stores programs that the central control unit 14 uses to perform usual control of the exchange and to provide the camp-on service, as well as programs for the camp-on service control of the present invention hereinafter described.

Figure 2:
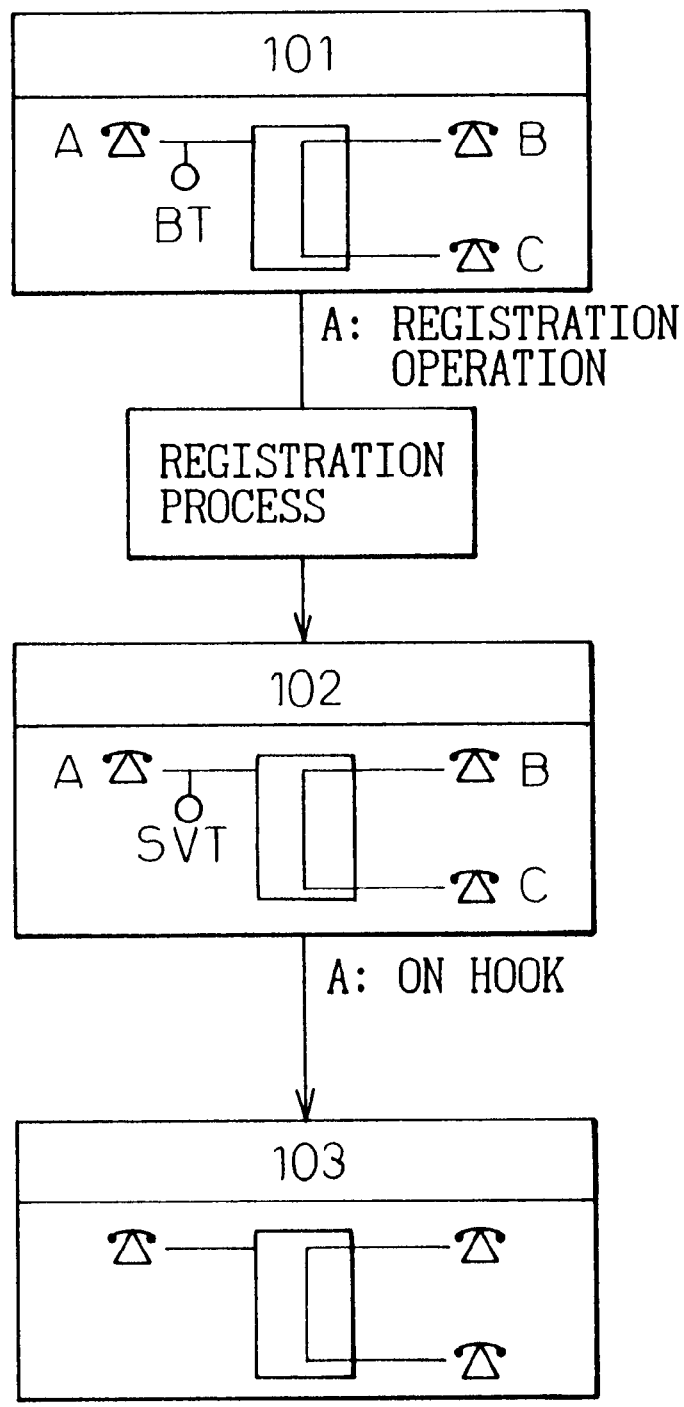
FIG. 2 is a state transition diagram for the camp-on service control of the present invention.
Figure 3:
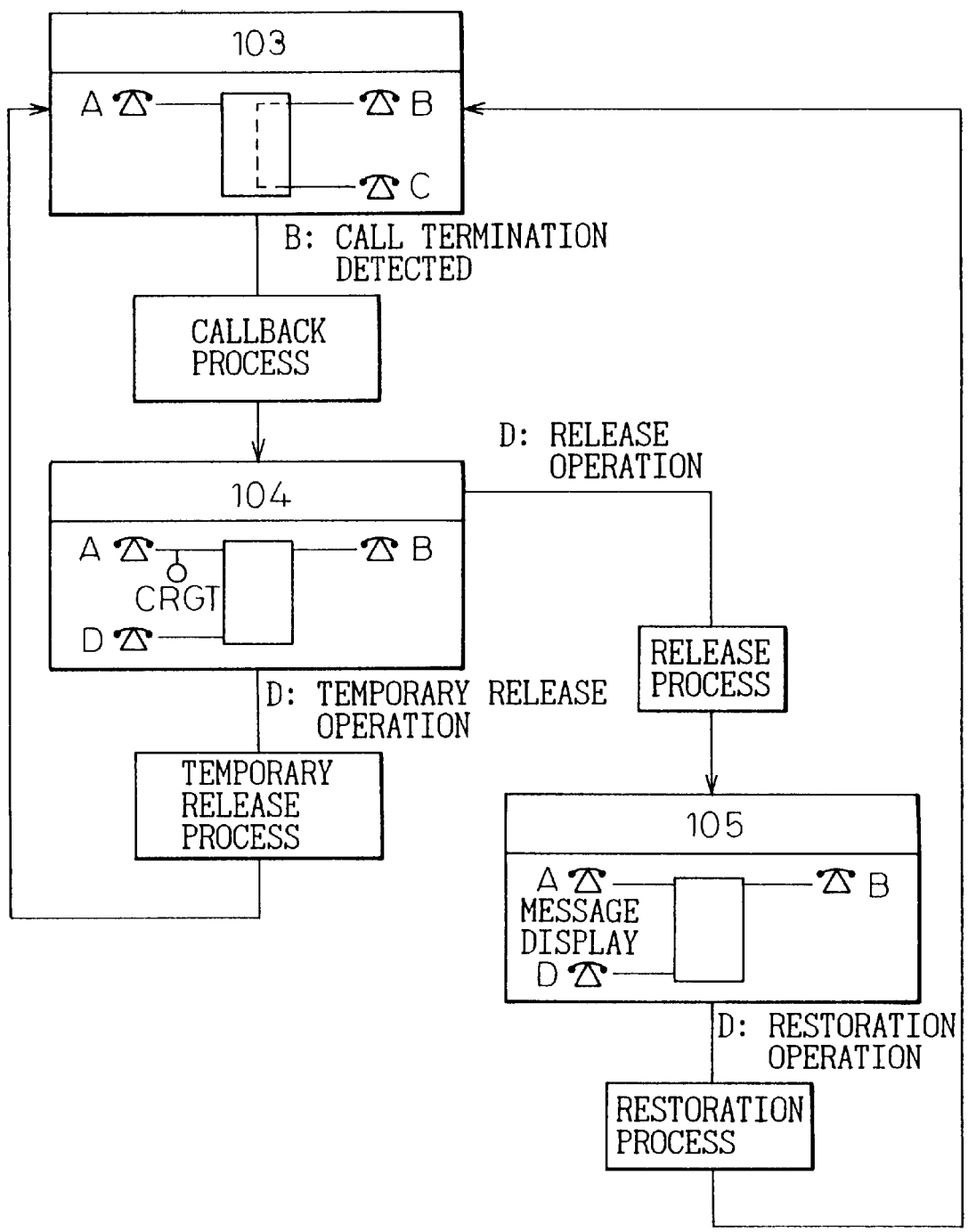
FIG. 3 is a state transition diagram for the camp-on service control of the present invention.

FIGS. 2 and 3 are state transition diagrams for explaining the camp-on service control of the present invention.

Figure 4:
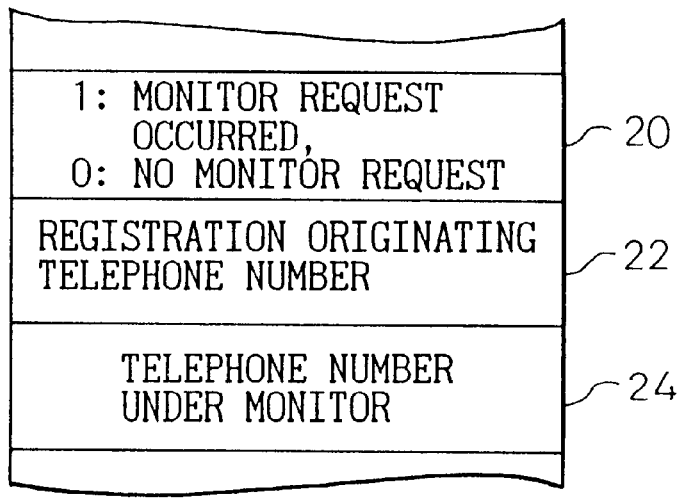
FIG. 4 is a diagram showing data for camp-on monitoring.

First, in state 101, a busy tone is connected to the telephone A because the telephone B called by the telephone A is engaged in communication with the telephone C. In this state, when the user of the telephone A dials a special number for camp-on or presses the camp-on feature button on the telephone, a camp-on registration process is executed, and a transition is made to state 102. In the registration process, "1" indicating "MONITOR REQUEST OCCURRED" is stored in camp-on monitor request data 20, as shown in FIG. 4, and the telephone numbers of the telephone A and the telephone B are stored in the registration originating telephone number 22 and telephone number under monitor 24, respectively.

Monitoring of the telephone B is thus initiated. The monitoring process is activated at predetermined intervals of time, to detect whether the busy state of the telephone being monitored is cleared or not, by examining "CALL STATUS" in the subscriber data corresponding to the telephone number under monitor for which the camp-on monitor request data 20 is set to "1".

In state 102, a service registration tone (SVT) is connected to the telephone A, letting the user of the telephone A know that the camp-on registration has been made. After that, the user of the telephone A goes off-hook to make a transition to state 103.

Figure 5:
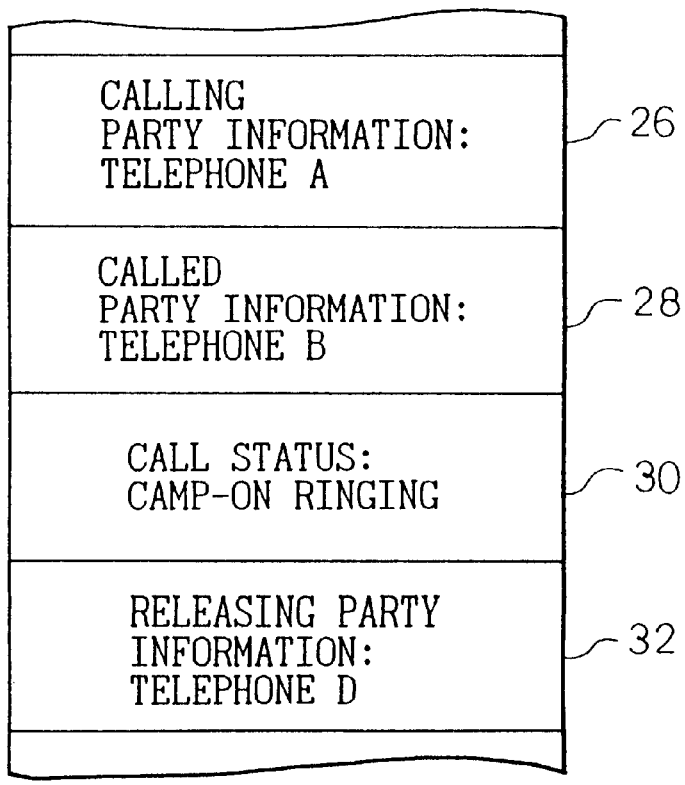
FIG. 5 is a diagram of a CCB which is seized for a callback.

In state 103 in FIG. 3, when the call of the telephone B is terminated, the state is detected in the next monitoring cycle, and a callback process is executed. In the callback process, first a CCB is seized. In the seized CCB, as shown in FIG. 5, the telephone number, etc. of the telephone A are stored in the calling party information section 26, the telephone number, etc. of the telephone B are stored in the called party information section 28, and "CAMP-ON CALLBACK IN PROGRESS" is set in the call status section 30. On the other hand, "CAMP-ON RINGING" is set in the subscriber data of the telephone A. Next, a camp-on ringing tone (CRGT) is connected to the telephone A, and a transition is made to state 104.

In state 104, if the user of the telephone A is at his desk and answers by taking the telephone off-hook, a call is automatically made for connection with the telephone B. If the user of the telephone A is not at his desk, the user of another telephone belonging to the same group can stop the ringing of the telephone A by performing the temporary release operation or release operation hereinafter described. The camp-on ringing tone is distinguishable from the usual ringing tone as the ringing cadences are different.

When the user of the telephone A has left his desk temporarily and is expected to return by the next monitoring cycle, it is fitting to perform the temporary release operation just to stop the ringing temporarily. Otherwise, it is fitting to perform the release operation to stop the monitoring itself until the user of the telephone A returns to his desk.

In state 104 in FIG. 3, when the user of the telephone D belonging to the same group dials a special number for a temporary release operation or presses the corresponding feature button, the temporary release process is initiated. In the temporary release process, the telephone A, which belongs to the same group as the telephone D and which has the setting "CAMP-ON RINGING" in its subscriber data, is identified. Then, the camp-on ringing tone connected to the telephone A is disconnected, and the state returns to state 103.

In state 104, when the user of the telephone D dials a special number for a release operation or presses the corresponding feature button, the release process is initiated. In the release process, the telephone A, which belongs to the same group as the telephone D and which has the setting "CAMP-ON RINGING" in its subscriber data, is identified. Then, the information of the telephone D is stored in the releasing party information section 32 in the CCB (FIG. 5) seized for the callback operation, the contents of the registration originating telephone number 22 and telephone number under monitor 24 are temporarily saved in the subscriber data of the telephone D, and the camp-on monitor request data 20 is cleared to 0. Next, the camp-on ringing tone connected to the telephone A is removed and, if the telephone A is equipped with a display, a message "SERVICE RELEASED", notifying the user that the camp-on was released on his behalf while he was away, is displayed. Finally, the CCB of FIG. 5 is released, and a transition is made to state 105.

In state 105, when the user of the telephone D dials a special number for a camp-on restoration operation or presses the corresponding feature button, the restoration process is initiated. In the restoration process, the telephone numbers saved in the subscriber data of the telephone D are restored into the registration originating telephone number 22 and telephone number under monitor 24 in FIG. 4, and the camp-on monitor request data 20 is set to 1. The monitoring of the call status of the telephone B is thus resumed. A message "CALLBACK RECEIVED", notifying that a camp-on callback was received during absence, is displayed on the display of each of the telephones A and D, and a transition is made to state 103.

What is claimed is:

1. A camp-on service control method comprising the steps of:

monitoring a first telephone at predetermined intervals of time to check if the first telephone is busy or not;

calling back a second telephone if the first telephone is not busy; and stopping the calling back step when a specific number is sent out from a third telephone while the second telephone is being called back.

2. A method according to claim 1, wherein the second telephone and the third telephone belong to the same group, and wherein the method further comprises the step of identifying the second telephone being called back from among telephones belonging to the same group when the specific number is sent out from the third telephone.

3. A method according to claim 2, further comprising the step of stopping the monitoring of the first telephone when the specific number is sent out from the third telephone.

4. A method according to claim 3, further comprising the step of resuming the monitoring of the first telephone when a second specific number is sent out from the third telephone.

5. A camp-on service control apparatus comprising:

means for monitoring a first telephone at predetermined intervals of time to check if the first telephone is busy or not;

means for calling back a second telephone if the first telephone is not busy; and means for stopping a call back to the second telephone when a specific number is sent out from a third telephone while the second telephone is being called back.

6. An apparatus according to claim 5, wherein the second telephone and the third telephone belong to the same group, and wherein the apparatus further comprises means for identifying the second telephone being called back from among telephones belonging to the same group when the specific number is sent out from the third telephone.

7. An apparatus according to claim 6, further comprising means for stopping the monitoring of the first telephone when the specific number is sent out from the third telephone.

8. An apparatus according to claim 7, further comprising means for resuming the monitoring of the first telephone when a second specific number is sent out from the third telephone.

* * * * *